Aug. 22, 1967 A. SILVERSTEIN 3,337,693

CHOPPER DEMODULATOR SYSTEM FOR DIRECT-RECORD TAPE RECORDERS

Filed June 30, 1964

INVENTOR.
Abraham Silverstein

BY [signature]

ATTORNEY.

United States Patent Office 3,337,693

Patented Aug. 22, 1967

3,337,693
CHOPPER DEMODULATOR SYSTEM FOR DIRECT-RECORD TAPE RECORDERS

Abraham Silverstein, 8009 14th Ave., Hyattsville, Md. 20783

Filed June 30, 1964, Ser. No. 379,420
4 Claims. (Cl. 179—100.1)

Figure 1:
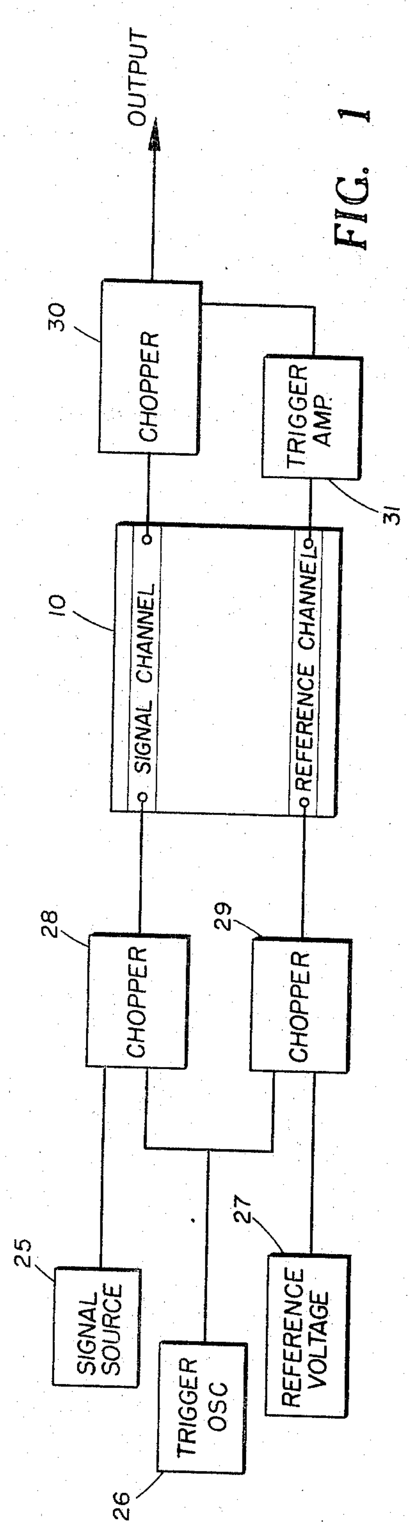

The invention described herein may be manufactured and used by or for the Government of the United States of America for governmental purposes without the payment of any royalties thereon or therefor.

The present invention relates to direct record tape recorders and more particularly to a method and means of wide band recording directly on magnetic tape and recovering the recorded signal in such a manner as to provide low composite wave form distortion while achieving maximum dynamic range and tape speed economy.

The advantages and novel features of the present invention can be best understood only after a critical examination of the presently available methods of tape recording and the disadvantages inherent therein.

*Direct recording*

The common direct record system is capable ideally of exhibiting excellent dynamic range during recording, and the upper limit of this range is fixed by the on-set of tape saturation. The lower limit is determined by system noise, chiefly produced in the playback electronics. Since the playback head voltage varies as flux change, $d\phi/dt$, the amplifier stage following the playback head is required to compensate for the differentiation by having a low frequency response and a 90° phase shift for each c.p.s. frequency shift. Extreme amplification is required at the lowest frequencies and instability and noise limit the low frequency compensation to about 50 c.p.s.

Some high quality recorders for technical use are rated from about 100 c.p.s. upward and have lower noise and better dynamic range than the average direct recorder because the troublesome low frequency amplification peak is reduced. However, a trial of even the finest direct recorders with excellent frequency compensation shows that a square wave is not reproduced as a square wave, but rather as a form of sawtooth wave due to phase errors in playback. While the low frequency response is limited to about 50 c.p.s., the high frequency response limit is proportional to tape speed; for example, a tape speed of 7½ inches per second yields a response of approximately 20 kc.

*The FM recorder*

The FM tape recorder ideally has a good dynamic range. It will record down to zero c.p.s. and, within its frequency limits, will reproduce a square wave without distortion. However, for a given tape speed, it has about 1/10 the frequency range of the corresponding direct recorder. This disability is inherent. The FM carrier is generally recorded to saturation or limited electronically on playback, and the information capability in recording gradation is that used as in direct recording.

There is usually a need for DC amplifiers in FM recording and the consequent drift of DC amplifiers is always a deficiency in an FM system. Furthermore it is necessary to keep the FM record oscillator and the playback discriminator critically aligned. Ofter the playback machine to be used is not known and this further adds to the above problem of critical alignment.

It is further required that the tape transport on record and playback be accurate and constant to about 0.1%. Any deviation in tape speed or tape stretch will generate a spurious signal indistinguishable from the genuine signal.

The finest tape transports are consequently none too good and if low frequency recording is required many users feel that the dynamic range is not dependably better than 10:1.

Summarizing, the idealized FM recorder when compared to the direct recorder lacks the advantage of tape economy. The playback electronics is complicated and relatively unstable compared to a direct record system. The dynamic range is limited by the spurious signals generated by transport and electronics and the critical alignment between playback discriminator and FM record oscillator is usually present.

*Carrier erase system*

The direct record system cannot reproduce the lowest frequencies because the playback head voltage, being proportional to frequency, falls to excessively low levels. This difficulty is avoided in the carrier erase system.

In the carrier erase system a tape is prepared by direct recording a fixed frequency in about the middle of the tape range to a certain degree of saturation. To record signal information, the tape is subjected to direct recording over the prerecorded carrier. The recorded information signal will demagnetize the carrier when its sense opposes that of the carrier but will not increase magnetization in the presaturated sense. In playback the signal is recovered as a series of spikes of varying amplitude at the carrier frequency. The output level is high for low frequencies since the carrier frequency is high. In other systems of carrier erase, no use is made of the sense of the pulses.

To recover the information signal, a polarized signal is used to delete the carrier and thereafter the output is simply rectified.

Compared to FM recorders which will also record the lowest frequencies, the equipment used in carrier erase systems is quite simple. However the dynamic range in carrier erase recording may be poor for several reasons. One inherent weakness in carrier erase is the fact that when the signal is the lowest, the carrier level is high or highest. Because of the Barkhausen effect, a certain fraction of the carrier magnetization of a tape will be erratic or equivalent to superimposed noise, and this effect limits the minimum signal level which can be recorded. As in FM recorders, the tape speed fluctuation results in a varying amplitude of the high level carrier and tape irregularities cause the carrier to fluctuate, also limiting the minimum signal level.

*The deleted reference system*

A good many years ago a solution was found to the problem of amplifying small direct and low frequency voltages to the point where they could actuate the pin on a moving roll chart. Then, as now, DC amplifiers could not be trusted to retain a null balance.

There were available multiple pole-double throw switches which could be driven by vibrators or rotary motors at about 100 c.p.s. In one type of deleted reference system, which was derived from the double reversal system, these switches were connected as reversal switches and used to invert direct and low frequency signal voltages at the switching frequency. The signal frequency was destroyed by the reversals and converted into sidebands about the switching frequency. In this form the signal could be sent through an AC amplifier which of course has no nulling problem. At the output of the amplifier a second reversal switch was applied to the inverted signal and this reversal switch was driven by the same motor vibrator for oscillator driving the input reversal switch so that the switching frequencies were the same. The result of the double reversal was that the original signal was reconstituted with polarity or phase preserved. Apart from a small contact noise inherent in these multiple pole-double throw switches, no spurious signal could be produced by drifting of DC levels in vacuum tubes. There were noise additions and modulations on the original signal due to the uncertain contact dwell time of the slow mechanical switches, but the heavy pin would not normaly respond to these variations. The double inversion enabled the worker to get any frequency, however low, through a stable AC amplifier. This subject is treated in the book entitled, "Information Transmission, Modulation and Noise" by Mischa Schwartz, McGraw-Hill (1959), page 163.

Accordingly, the present invention applies the principle of transforming direct and alternating signals in the above described manner for passing signals through a stable AC amplifier to wideband tape recording. Present day transistorized choppers have negligible switching time and maximum chopping frequencies above 100 kc. Their noise level is about 0.1 millivolt while the maximum voltage output is at least 15 volts. The dynamic range of the direct recording system to be described is greater than that of existing recorders and this will become more fully apparent hereinafter. The dynamic range of the recording system overlaps the normal recorder input levels.

The improved system of the present invention has overcome many of the above described disadvantages with respect to the prior art recording systems. The deleted reference system of the present invention will record down to 0 c.p.s. and it is feasible to record up to the chop frequency which can be at least half the direct record frequency. This compares with the dynamic range ratio of 10:1 for the ratio of direct record dynamic range to the dynamic range of an FM system with a given tape speed.

The record-playback system of the present invention produces a zero signal channel output for a zero signal input. The signal channel output is not dependent upon the recorder and playback tape transport having the same speed or dependent upon the flutter and wow in either the record or playback machine.

There is no electronic alignment required in the present system as is required between the recorder oscillator and playback discriminator in FM systems.

In the present invention the zero signal level is not dependent upon tape uniformity as in the carrier erase system and the wandering zero is the greatest limitation on dynamic range in FM and carrier erase systems.

The absence of a high level carrier as in carrier erase removes the source of Barkhausen noise.

The electronics of the recorder of the present invention is quieter than the electronics of direct record systems since the recordation of even the lowest frequencies does not require that the recording frequency be dropped below several hundred cycles per second. This fact becomes important since the low frequency peak in direct record systems is a source of noise and instability. Additionally, the record playback system of the present invention employs a reference channel to provide an accurate time base which can be used to compensate for tape transport errors. In carrier erase systems the transport errors are inserted in the prerecorded signal.

Finally, the output level of the reference channel used in the tape recorder of the present invention provides a measure of tape density.

An object of the present invention is to provide a new and improved wideband record-playback system.

Another object of the invention is to provide a record-playback system which will record down to zero cycles per second and which is capable of providing an excellent dynamic range for the recorded signals.

A further object of the invention is to provide an improved record-playback system which will overcome each of the specifically enumerated disadvantages of prior art recording systems as set forth in detail above.

Figure 2:
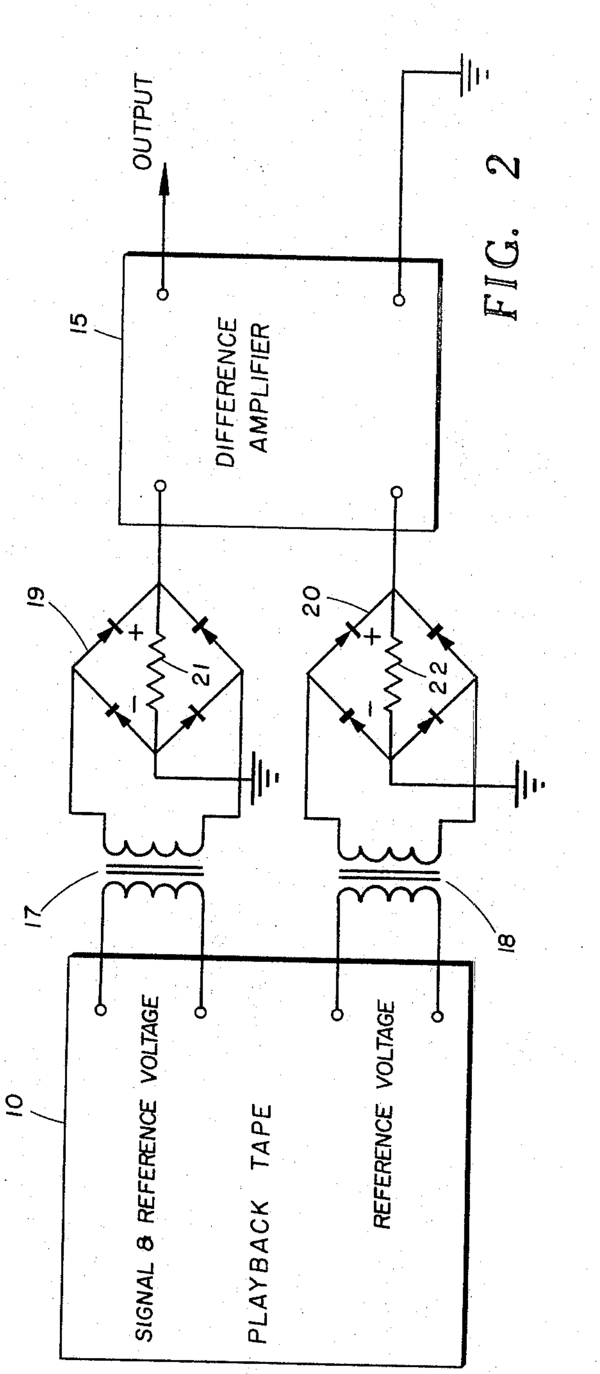

Other and further objects of the invention will become more fully apparent in the following description of the separate embodiments thereof in the accompanying drawings wherein:

FIG. 1 is a functional block diagram representation of the record-playback system of the invention; and FIG. 2 illustrates the demodulator circuitry used to recover a true replica of the information signal recorded using the tape recorder of FIG. 1.

The double reversal recording system of the present invention is shown in FIGS. 1 and 2. A trigger oscillator 26 has its input connected to a pair of identical transistor reversal choppers 28 and 29 for driving these choppers at a high frequency rate, for example, in the vicinity of 5 kc. A signal source 25 has its input connected to chopper 28 while reference voltage source 27 has its input connected to chopper 29. Each of the transistor choppers is connected to a record-playback machine 10 for recording the reversal chopped signal on a signal channel and the reversal chopped reference voltage on a reference channel of a magnetic tape. The reference voltage 27 used may, for example, be a 1.5 volt dry cell, the chop frequency may be in the vicinity of 5 kc., and the tape recorder range may be between 50 c.p.s. and 10 kc.

Once the reversal chopped information signal and the reversal chopped reference voltage are recorded on separate channels of magnetic tape in the record-playback machine 10, the tape may be stored for later playback on a stereo playback machine which is not combined with the recorder used to record the signals.

In FIG. 1 the square wave output of the reference channel is coupled to a trigger amplifier 31 using any convenient magnetic pickup device (not shown). Trigger amplifier 31 has its output connected to one input of transistor chopper 30 for reversal chopping the signal on the signal channel of the tape a second time. This second reversal chopping action using transistor chopper 30 reconstitutes the information signal. Using an imperfect recorder response, the signal with its components will be restored at least up to the chop frequency plus noise additions due to switching. It is obvious that if an in-line multichannel recorder is used, the same reference channel can serve for several chopped signal channels. Limited only by erratic tape stretch, a phase shift adjustment can align physically separate playback heads.

The same result described with reference to FIG. 1 can be obtained using the demodulator circuitry of FIG. 2 which eliminates the necessity of using a third transistor chopper. In the embodiment of FIG. 2 recording has been performed in the manner described with reference to FIG. 1. In this system however the outputs of the signal and reference channels of the playback tape have been combined and transformer coupled at 17 to the input of diode bridge 19. A second diode bridge poled identical to bridge 19 has its input transformer coupled at 18 to the chopped reference signal only. By adding the voltages developed across resistors 21 and 22 in a difference amplifier the resultant rectified DC voltages due to the reversal chopped reference voltages will cancel and thus yield only the reconstituted signal voltage at the output of the difference amplifier 15.

The reference channel voltage level should be at least equal to the maximum level of the signal channel when mixed in the difference amplifier 15. A large reference voltage will minimize distortion if single sideband recording is attempted using a chop frequency near the upper frequency limit of the tape. A minimum level of reference voltage is also necessary to permit sufficient rectification. The reference voltage minus the maximum inverted signal should be large enough for efficient rectification at the diode bridges 19 and 20.

The output of diode bridge 19 is the rectified sum of the signal and reference voltages applied to transformer 17 while the output of bridge 20 is the rectified reference voltage applied to transformer 18. The differential amplifier 15 has a high input impedance for coupling to the outputs of resistors 21 and 22 in the diode bridges and the mixing of signals is prevented using a differential amplifier having a low output impedance.

The sum of the outputs across 21 and 22 can be critically adjusted equal to each other in the absence of a signal voltage and with this condition prevailing the output of differential amplifier 15 will be zero. All reference channel noises due to tape fluctuations, Barkhausen noise, chopper noise, etc. are also annulled in the embodiments of FIGS. 1 and 2. The end result operationally using the system of FIG. 2 is ideally equivalent to that obtained suing the double inversion system described above with reference to FIG. 1.

Obviously many modifiactions may be made in the above described embodiments without departing from the spirit and scope of the invention. For example a pair of diodes could be used in place of each bridge if desired. It is therefore to be understood that the invention is limited only by the scope of the appended claims.

I claim:

1. A record-playback system comprising:

(a) an information signal source, (b) a reference voltage source, (c) chopper means connected to said reference and signal sources for synchronously reversal chopping signals from the reference voltage and signal voltage sources, (d) tape recorder means coupled to said reference and signal sources for recording the chopped signals on separate channels of a magnetic tape, (e) playback means for reproducing signals recorded in said separate channels, (f) means for algebraically adding the chopped signals in each channel, (g) first means coupled to the added signals for full wave rectifying said added signals in a positive sense, and (h) second means coupled to the reversal chopped reference voltage channel for full wave rectifying the reversal chopped reference voltage in a positive sense, and (i) means for amplifying the separately rectified voltages in a differential amplifier whereby the chopped reference voltage in each channel cancels and leaves a reproduction of the information signal from said signal source.

2. The system of claim 1 wherein:

(a) said first means for full wave rectifying in a positive sense comprises a diode bridge circuit transformer coupled to the algebraic sum of the reversal chopped signal and reference voltages, (b) said second means for full wave rectifying in a positive sense comprises a diode bridge circuit transformer coupled to said reversal chopped reference voltage, and (c) resistance means in each bridge circuit for passing current therethrough to develop voltages of the same polarity thereacross whereby the application of said voltages to said difference amplifier yields a zero voltage output in the absence of a signal voltage applied at said information signal source and a reconstituted signal voltage output signal upon the application of a signal voltage at said information signal source.

3. The combination of claim 1 wherein said chopper means includes a pair of identical transistor choppers coupling said signal and reference voltage sources to said tape recorder means, and oscillator means having its output connected to said transistor choppers for driving said choppers at the reversal chop frequency.

4. The combination of claim 3 wherein (a) said first means for full wave rectifying in a positive sense comprises a diode bridge circuit transformer coupled to the algebraic sum of the reversal chopped signal and reference voltages, (b) said second means for full wave rectifying in a positive sense comprises a diode bridge circuit transformer coupled to said reversal chopped reference voltage, and (c) resistance means in each bridge circuit for passing current therethrough to develop voltages of the same polarity thereacross whereby the application of said voltages to a difference amplifier yields a reconstituted information signal and causes the cancellation of all noise due to tape fluctuation, Barkhausen noise and chopper noise.

References Cited

UNITED STATES PATENTS

| | | | |
|---|---|---|---|
| 2,985,840 | 5/1961 | Theodore et al. ------ | 330—10 |
| 3,084,011 | 4/1963 | Polic ------------ | 346—74 X |

BERNARD KONICK, *Primary Examiner.*

L. G. KURLAND, *Assistant Examiner.*